United States Patent [19]
Koch

[11] 3,909,053
[45] Sept. 30, 1975

[54] SIDE FENDER
[75] Inventor: Terry David Koch, Telford, Pa.
[73] Assignee: Inno-Cept Corporation, Lansdale, Pa.
[22] Filed: June 24, 1974
[21] Appl. No.: 482,070

Related U.S. Application Data
[62] Division of Ser. No. 297,949, Oct. 16, 1972, Pat. No. 3,866,733.

[52] U.S. Cl. ............... 293/62; 37/1; 280/150 B; 293/70; 293/98; 293/99
[51] Int. Cl.² ............... B60P 3/06; B60R 19/02; B61F 19/04; E02F 9/24
[58] Field of Search ......... 172/801; 214/85; 280/2, 280/150 B; 293/1, 62, 89, 95, 96, 97, 98, 70, 99; 37/1

[56] References Cited
UNITED STATES PATENTS

| | | | |
|---|---|---|---|
| 617,101 | 1/1899 | Kelly | 293/62 |
| 1,328,283 | 1/1920 | Kaiser | 293/95 X |
| 1,369,636 | 2/1921 | Dwork | 293/98 X |
| 1,539,114 | 5/1925 | Halladay | 293/97 |
| 1,572,118 | 2/1926 | Laher | 293/96 |
| 1,588,736 | 6/1926 | Hornquist | 293/62 |
| 1,595,391 | 8/1926 | Fageol | 293/62 X |
| 2,002,832 | 5/1935 | Robinson | 293/62 |
| 2,443,611 | 6/1948 | Ferguson | 214/85 |
| 2,530,866 | 11/1950 | Evans et al. | 280/2 X |
| 2,784,508 | 3/1957 | Risk | 172/801 |
| 3,866,773 | 2/1975 | Koch | 293/1 X |

Primary Examiner—M. Henson Wood, Jr.
Assistant Examiner—Howard Beltran
Attorney, Agent, or Firm—James Albert Drobile

[57] ABSTRACT

A device for substantially reducing or eliminating the risk of serious or fatal injury to motorists from a collision of a motor vehicle with a large bulldozer in transit upon the bed of an open trailer on a highway.

A pair of longitudinally-extended, rigid guard members, each of which is mounted generally adjacent and parallel to the exterior side of one of the two opposing blade-lifting arm members pivotally connecting the blade with the main chassis of the bulldozer. The guard members are of such length and configuration that each extends inwardly at one end to partially enclose at least a portion of the adjacent vertical edge of the blade, and inwardly at the other end to partially enclose the extremity of the adjacent blade-lifting arm member. Each of the guard members preferably is removably mounted to the adjacent blade-lifting arm member through a plurality of separable connecting means.

2 Claims, 7 Drawing Figures

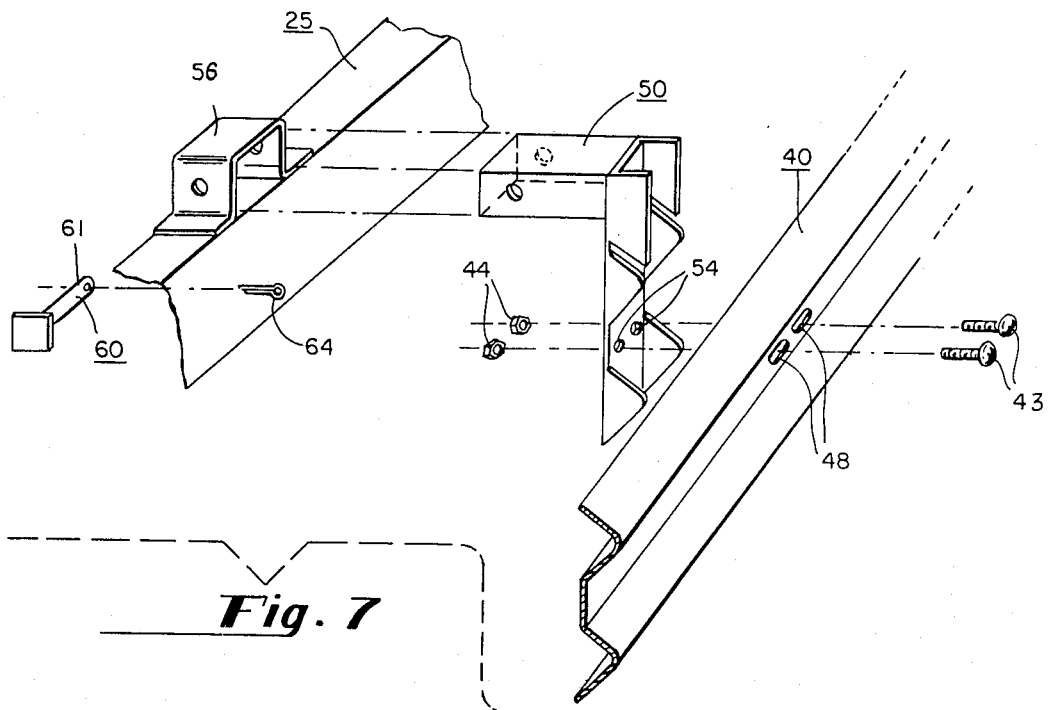
Fig. 7
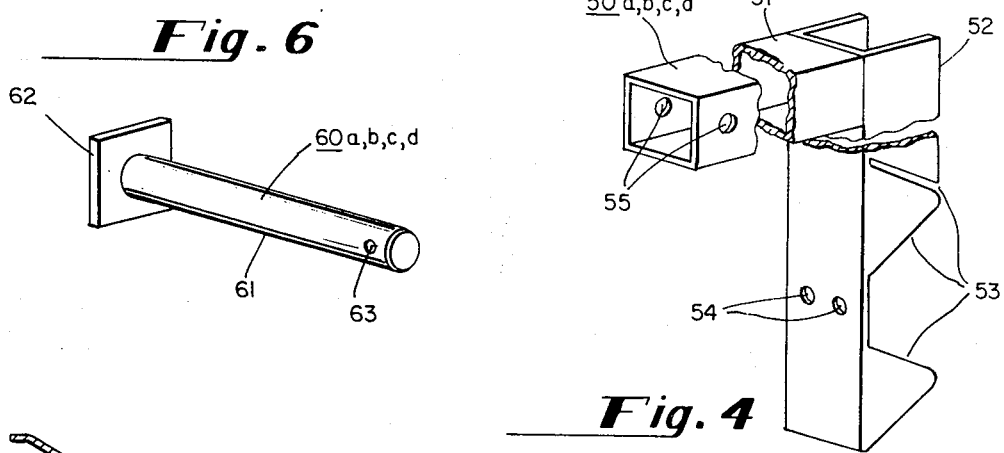
Fig. 6
Fig. 4
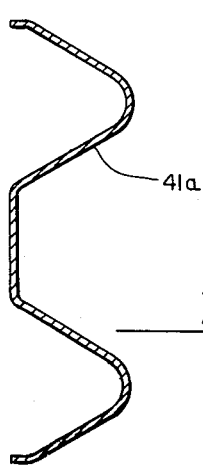
Fig. 3
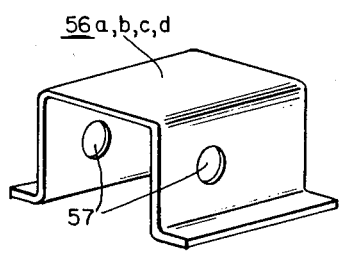
Fig. 5

SIDE FENDER

This is a division of application Ser. No. 297,949 filed Oct. 16, 1972, now U.S. Pat. No. 3,866,773 issued Feb. 18, 1975.

BACKGROUND OF THE INVENTION

1. Field of the Invention

This invention relates generally to the transportation of large earth-moving equipment, such as a bulldozer having a very wide blade of, say, ten feet or more, upon an open-sided trailer from one location to another via roadways. More particularly, the invention is directed to a protective device and method for preventing the serious or possibly fatal injuries which otherwise might be sustained by a motorist in a collision with a bulldozer-transporting trailer on the highway.

2. Description of the Prior Art

In construction projects it is common to utilize large earth-moving equipment, such as a bulldozer with a wide blade, to excavate, level or otherwise temporarily or permanently change the contour of the ground at the construction site. When needed, such a bulldozer typically is brought to the construction site by being transported over the highways upon a suitable vehicle, such as an open-sided, low-bed trailer, rather than under its own motive power.

The transportation upon such a trailer of a bulldozer having a blade width significantly in excess of the width of the trailer poses a risk of injury to the occupants of motor vehicles traversing the same roadway. Thus, there is a history of serious and sometimes fatal accidents involving the collision of a motor vehicle with the protruding edges of the bulldozer blade. The risk of fatality in such accidents is heightened by the dangerous configuration and orientation of the blade.

The obvious risks, and the history of serious accidents, incidental to the transportation of a large bulldozer on an open-sided trailer, have prompted some governmental agencies to establish stringent regulations governing such transportation, and to impose very substantial penalties for the violation of those regulations. For example, in some states it is mandatory, before a bulldozer having a blade in excess of a specified width, e.g., over ten feet, can be transported, that a permit be obtained and that the blade actually be removed in transit. This requirement that the blade be removed during transit and, consequently, that it be reassembled with the bulldozer at the job site, necessarily introduces very substantial additional costs which ultimately must be borne by the person on whose behalf the bulldozer is utilized. Thus, not only does the removal of the blade before transit necessitate added time, special equipment and additional manpower, but similar requirements are also involved at the construction site. Furthermore, the special equipment and additional personnel needed to position the blade properly with respect to the bulldozer chassis usually must be transported along with the bulldozer to accomplish the reassembly at the job site.

The above-mentioned precautions and regulations pertaining to the transport of a large bulldozer over the roadways, while clearly necessary for the safety of other motorists, do represent added costs which could be eliminated in the interests of economy if a safe method were available for the highway transportation of large bulldozers with blade intact. It is a primary object of this invention to provide a method and a device for the safe highway transportation of large bulldozers on trailers without the necessity of removing the bulldozer blades.

SUMMARY OF THE INVENTION

In accordance with the method of the present invention, a so-called large bulldozer (i.e., one having a blade whose width significantly exceeds that of the conventional trailer, e.g., a blade width of ten feet or more) is equipped for transit on the trailer with a specific protective device which eliminates or substantially reduces the risk that serious injuries will result from a collision of another motor vehicle with the bulldozer-transporting trailer.

The protective device of the invention comprises a pair of longitudinally-extended and very rigid guard members, each of which is of a length and configuration such that, when mounted on the side of the bulldozer in the appropriate position, it is adapted to at least partially enclose, and shield from direct impingement, dangerous protrusions such as the vertical edge of the bulldozer blade. Typically, the guard members are appropriately mounted, in opposing manner, generally parallel and adjacent to the blade-lifting arm members which pivotally connect the bulldozer blade with the main portion of the bulldozer chassis. When so positioned, one end of each guard member typically extends inwardly to enclose at least a portion of the adjacent vertical edge of the bulldozer blade, thus preventing another motor vehicle from impinging directly upon that blade edge in a collision. Experience has shown that it is just such an impingement which has been responsible for the serious and sometimes fatal injuries resulting from a collision on the highway between the bulldozer-carrying trailer and another motor vehicle. The other end of each guard member is extended inwardly to enclose at least a portion of the other extremity of the adjacent lifting member. In this manner, all dangerous side protrusions of the bulldozer in transit are shielded from direct impingement.

In the case of large bulldozers of more or less conventional design, i.e., those having two large, opposing and generally horizontal blade-lifting arm members, the guard members conveniently and preferably are mounted, in opposing manner, to the respectively-adjacent blade-lifting arm member. Preferably, too, the guard members are mounted in a removable manner, through the use of one or more separable connecting means of suitable design. Also, in a preferred embodiment of the invention, each guard member is constructed in sections and in such a manner that its overall length is adjustable, so as to be accommodatable to a variety of bulldozer sizes and makes.

BRIEF DESCRIPTION OF THE DRAWINGS

FIG. 3 is a view, along line 3—3 in FIG. 1, of a section through a preferred embodiment of the guard member of the invention.

FIG. 4 is a view in perspective of a hanger block constituting an element of a preferred embodiment of the connecting means useful for removably attaching the guard members of the invention to a bulldozer.

FIG. 5 is a view in perspective of a receiving block constituting another element of the preferred connecting means referred to with respect to FIG. 4.

FIG. 6 is a view in perspective of a holding pin, constituting still another element of the preferred connecting means referred to with respect to FIGS. 4 and 5.

FIG. 7 is an exploded assembly view showing the manner in which are assembled the guard members, the hanger blocks, the receiving blocks and the holding pins constituting the preferred embodiment of the invention illustrated in FIGS. 1 through 6.

DETAILED DESCRIPTION OF THE INVENTION (INCLUDING PREFERRED EMBODIMENT)

Figure 1:
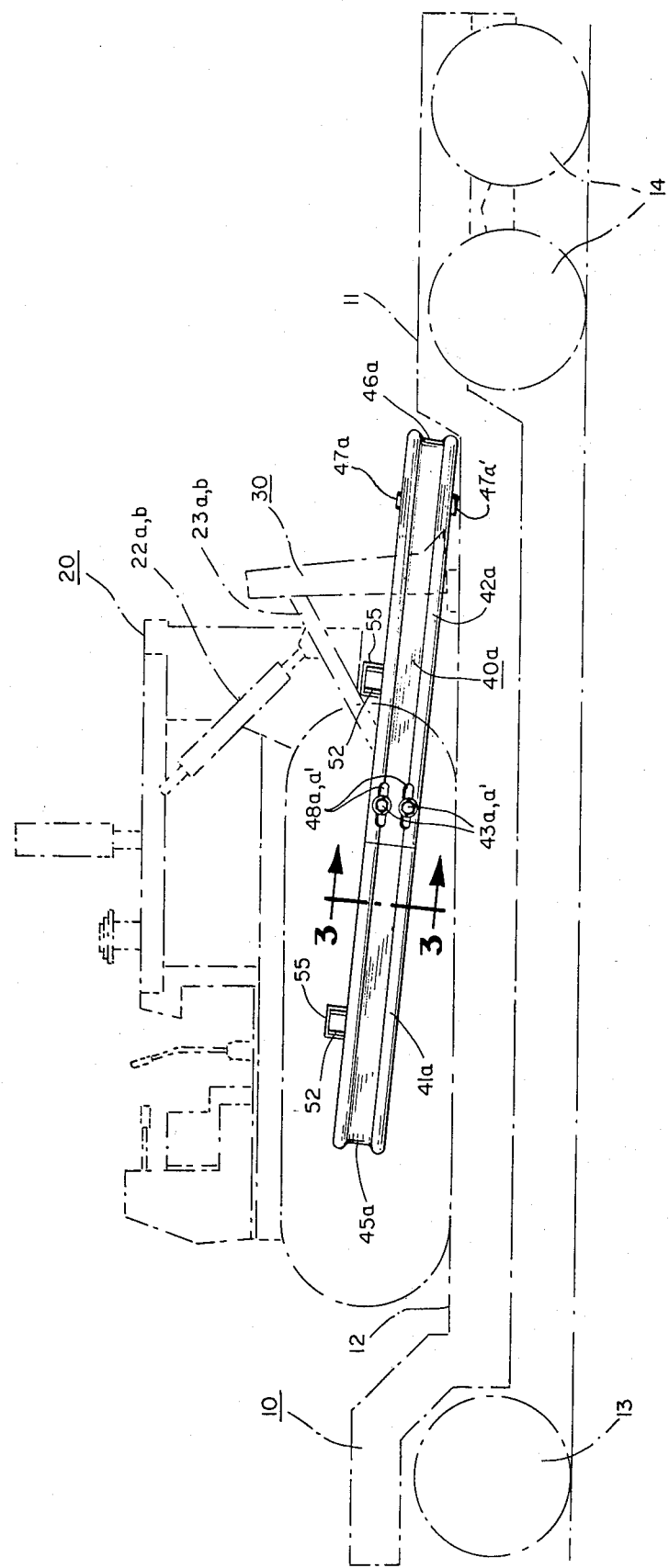
FIG. 1 is a side elevation view of a typical large bulldozer in transit on a low-bed trailer, illustrating the practice of a preferred embodiment of the present invention.
Figure 2:
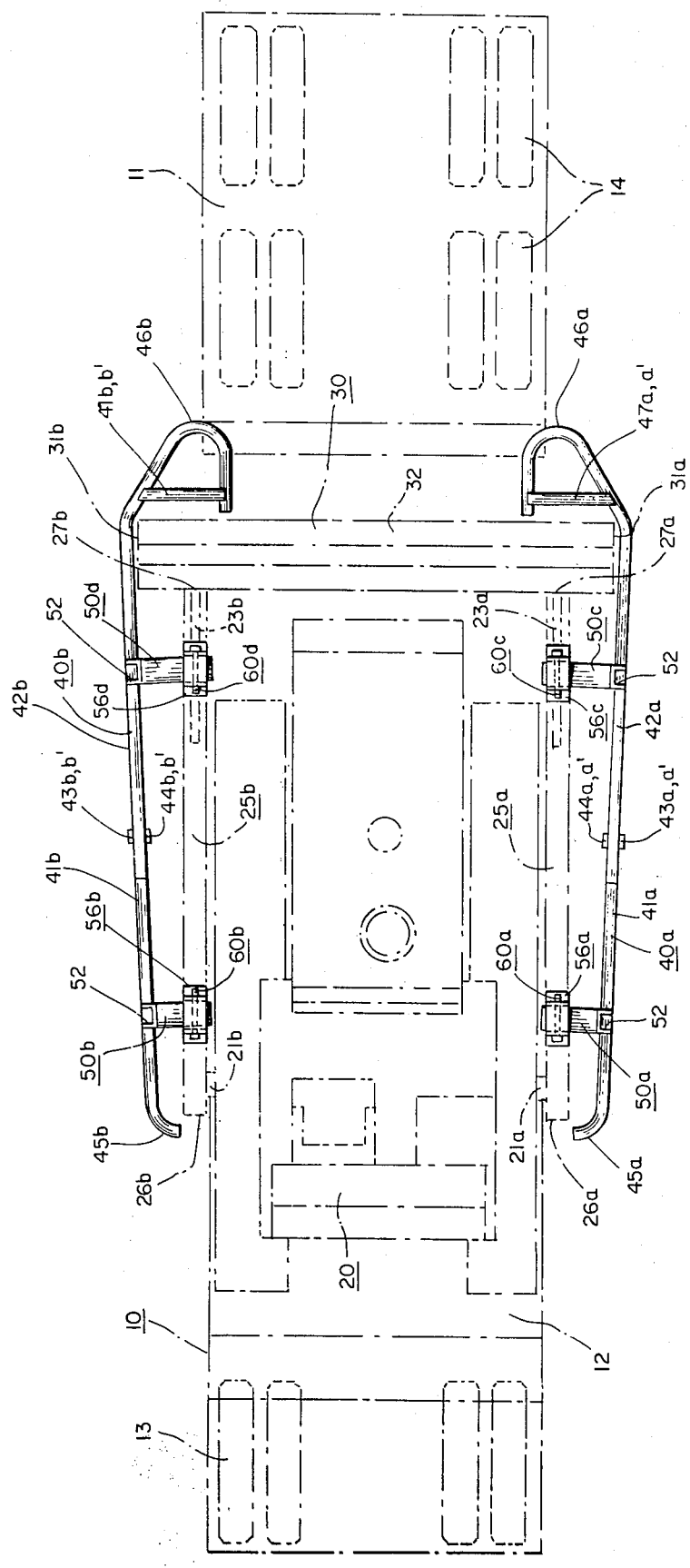
FIG. 2 is a plan view of the composite structure of FIG. 1.

The practice of the present invention typically involves the transport of a large bulldozer on an opensided highway trailer. FIGS. 1 and 2 illustrate the conventional manner and equipment by which such a bulldozer is transported over a roadway, FIG. 1 being a side view elevation, and FIG. 2 being a plan view, of an outline comprising a conventional trailer 10 on which is positioned a large, conventional bulldozer 20 equipped with a preferred embodiment of the protective device of the present invention.

As shown in FIGS. 1 and 2, conventional trailer 10 comprises chassis 11, with depressed "low-bed" section 12, supported on a plurality of forward wheels 13 and rearward wheels 14. Bulldozer 20 is positioned on the low-bed section 12 of trailer 10. Bulldozer 20 is of the conventional configuration, comprising a main chassis portion with blade 30 pivotally connected to such chassis through opposing bladelifting arm members 25a and 25b and respective opposing pivot means 21a and 21b, the latter being respectively located near extremities 26a and 26b of blade-lifting arm members 25a and 25b. Blade 30 is connected to arm members 25a and 25b at their respective other extremities, 27a and 27b. Raising and lowering of blade 30 is accomplished by conventional means, such as through opposing hydraulic cylinders 22a and 22b connected between the chassis of bulldozer 20 and, illustratively, corresponding reinforcing struts 23a and 23b joining blade 30 and blade-lifting arm members 25a and 25b. Blade 30 comprises face 32 and vertically oriented ends 31a and 31b.

In accordance with the practice of the present invention, the risk of serious injury to motorists resulting from collision of another motor vehicle with the bulldozer while in transit on the trailer is substantially reduced or eliminated by equipping the bulldozer with the preferred protective device illustrated in FIGS. 1 and 2.

In FIG. 2, the protective device is shown as comprising opposing guard members 40a and 40b, which are mounted to blade-lifting arm members 25a and 25b of bulldozer 20. Guard members 40a and 40b are constructed of a rigid material, such as steel, and are of such cross-section and thickness as to impart great strength and resistance to deflection. Conveniently, guard members 40a and 40b can be formed by conventional techniques, from available stock shapes, such as steel pipe of the requisite dimensions. FIG. 3 illustrates a preferred cross-sectional configuration for the guard members of the present invention. Other suitable configurations can be employed. The rearward ends 45a and 45b of guard members 40a and 40b are curved inwardly to enclose at least a portion of the rearward extremities 26a and 26b of arm members 25a and 25b. The forward ends 46a and 46b of guard members 40a and 40b are curved inwardly to enclose at least a portion of the adjacent ends 31a and 31b, and the face 32, of blade 30. Forward ends 46a and 46b of guard members 40a and 40b preferably also are reinforced top and bottom by struts 47a, a' and 47b, b' for additional strength and protection.

Preferably, guard members 40a and 40b are each fabricated in at least two sections, e.g., sections 41a and 42a of guard member 40a, and sections 41b and 42b of guard member 40b, as shown in FIG. 2. These sections preferably are joined midway of guard members 40a and 40b, as by a plurality of bolts 43a, a' and 43b, b' and of nuts 44a, a' and 44b, b', through elongated slots 48a, a' (FIG. 1) and 48b, b' (not shown), in such sections. By fabricating and assembling the guard members in this fashion, flexibility is provided so that an individual guard member can be accommodated to a range of bulldozer sizes and dimensions. In addition, fabrication of the guard members in two or more sections also permits of the assembly of those sections without special equipment or additional manpower such as usually would be required in order to handle a guard member of unitary construction. However, while fabrication of the guard members in sections is preferred, it should be understood that a guard member of unitary construction is suitable for use in the practice of the present invention.

The purpose of the protective device, and particularly of the guard members, of this invention is to substantially reduce or eliminate the fatalities or serious injuries which otherwise could result from a collision between another motor vehicle and certain protruding parts of a bulldozer when being transported on a trailer in the conventional manner and without removal of its blade over a roadway. The greatest danger of such fatalities or injuries normally is posed by protrusions such as the edges of the bulldozer blade and the blade-lifting arm members, particularly the abrupt extremities of those arm members at their respective points of connection with the bulldozer chassis. Accordingly, it is the purpose of this invention, and a requirement of its practice, that the guard members be positioned in relationship to those protrusions so as to shield and deflect a colliding motor vehicle from direct impingement upon any of such protrusions and, particularly, upon either the edge of the bulldozer blade or any protruding part of the blade-lifting arm members of the bulldozer. Thus, it is satisfactory in the practice of the present invention for the guard members to be mounted to any part of the bulldozer provided that they are disposed and maintained in a position relative to the blade edges and the blade-lifting arm members of the bulldozer suitable to the accomplishment of the intended purpose. In practice, it has been found preferable and convenient for each of the guard members to be mounted on its adjacent blade-lifting arm member through suitable connecting means. It also has been found preferable to so mount the guard members in a removable manner, through separable connecting means. A preferred embodiment of the latter type of connecting means is illustrated in FIGS. 4 through 7.

FIG. 4 illustrates one element of a preferred embodiment of separable connecting means useful in practicing the invention, viz., a hanger block which is adapted, on one side, for separable attachment to a guard member, and, on the opposite side, for removable insertion into a second element of the preferred connecting means, viz., a receiving block, to be discussed hereinafter. In FIG. 4, hanger block 50 is illustrated as being fabricated from a strong rigid material such as quarter-inch wall thickness steel structural tubing of rectangular cross-section. Hanger block 50 consists of a horizontal portion 51 which preferably is permanently connected, as by welding, to a vertical portion 52, both portions being fabricated from the indicated material. Horizontal portion 51 is adapted for removable insertion into a receiving block (not shown), and for retention in said receiving block by means of a pin (not shown) inserted through opposing holes in said receiving block and through opposing holes 55 in horizontal portion 51. As noted above, vertical portion 52 of hanger block 50 is conveniently fabricated from the same structural tubing shape as is horizontal portion 51. However, all of the outer side of vertical portion 52 has been removed, and, in addition, both of the opposing sides of said tubing which adjoin the side so removed have been modified, as at 53, to accommodate and mate with the rear face of a guard member 40. This modification is shown as having been performed to the lower portion of vertical portion 52, with the upper portion of vertical portion 52 being unmodified except insofar as the removal of its outer side. The over-all height of vertical portion 52 of hanger block 50 is determined by the dimensions and configuration of the bulldozer, and particularly by the orientation of the blade-lifting arm members and blade of the bulldozer, so that the guard member is positioned and maintained relative to the blade and the adjacent bladelifting arm member to afford the greatest protection against direct impingement upon those protrusions by another motor vehicle. Thus, the upper portion of vertical portion 52 can be made longer or shorter in order to accomplish the desired positioning of the guard member in relation to the adjacent blade-lifting arm member and the blade of the bulldozer. As will be described later, holes 54 in the vertical portion of hanger block 50 are provided as one means for effecting the attachment of the guard member to hanger block 50.

FIG. 5 illustrates the receiving block referred to above as another element of one preferred embodiment of the separable connecting means useful in the practice of this invention. Thus, in FIG. 5, receiving block 56 is shown as adapted by horizontal flanges to be fastened by suitable means, such as by welding or bolting, to the blade-lifting arm member of the bulldozer, and to receive the horizontal portion 51 of hanger block 50, illustrated in FIG. 4. Upon insertion of horizontal portion 51 of hanger block 50 into the opening of receiving block 56, this cooperative relationship can be maintained for as long as desired by means of pin 60 (not shown) inserted through coaxial holes 57 in receiving block 56, and through coaxial holes 55 in hanger block 50. Pin 60 is illustrated in FIG. 6, and consists of square head portion 62 and elongated cylindrical body portion 61. Body portion 61 is provided near its outer extremity with hole 63, for use in connection with conventional means such as a cotter pin 64 (not shown) to prevent the accidental withdrawal of pin 60. Through the use of pin 60 and cotter pin 64, hanger block 50 and receiving block 56 can be maintained in cooperating relationship in order to position and maintain guard member 40 properly with respect to the bulldozer blade and the adjacent blade-lifting arm member. On removal of cotter pin 64 and pin 60, hanger block 50 can be removed from receiving block 56 so as to permit removal of guard member 40 from its protective position.

FIG. 7 illustrates the manner in which the guard member 40 is removably attached to blade-lifting arm member 25 of a bulldozer through the use of separable connecting means comprising hanger block 50, receiving block 56, pin 60 and cotter pin 64 in accordance with a preferred embodiment of the invention. As also shown in FIG. 7, guard member 40 is removably attached to hanger block 50 through the use of bolts 43 inserted through elongated holes 48 in guard member 40, and through holes 54 in hanger block 50, for locking engagement with nuts 44. Alternatively, guard member 40 can be attached permanently to hanger block 50 by welding, riveting or the like. As shown in FIGS. 1 and 2, the connecting means illustrated in FIG. 7 are provided in duplicate. However, if necessary and desirable, a guard member may be attached to the adjacent side arm member through the use of more than two such connecting means.

In accordance with the practice of the method of the present invention, the traffic protecting device of the invention is mounted on a large bulldozer during transit. During transportation of a bulldozer equipped with the protective device of the invention, serious and possibly fatal injuries resulting from a collision of another motor vehicle with one or more protrusions of the bulldozer are avoided through the functioning of the protective device as a means to deflect and prevent the motor vehicle from harmful direct impingement upon such protrusions. After arrival at the construction site, the protective device is removed before the construction work begins. As noted before, no special equipment is required and no additional manpower is needed. Upon completion of the construction work, the bulldozer can be transported back to its storage site, again equipped with the protective device of this invention.

As noted hereinabove, a primary purpose and advantage of this invention is the elimination of the necessity for removal of the blade of a large bulldozer during transit of that bulldozer on a trailer in a conventional manner and over roadways traversed by the public. The elimination of such necessity (which is a legal requirement in some states) for removal of the bulldozer blade during transport obviously achieves a consequent saving in the costs incidental to providing a bulldozer at a job site. The suitability and acceptability of the method and device of the present invention, for accomplishing its purpose of permitting the transportation of a bulldozer on a trailer and over public highways without removal of the blade, has been confirmed by at least one state regulatory agency.

While the traffic protecting method and device of the present invention has been described in detail with reference to a particular and preferred embodiment, it is apparent that the disclosed embodiment can be modified in many ways through the use of substantially equivalent structures and means without departing from the broad concept of the present invention. it is therefore to be clearly understood that all such modifications in structures and means are contemplated and intended as falling within the scope of the present invention.

The invention claimed is:

1. Traffic protective device for reducing the risk of injury to motorists from a collision with a large bulldozer while in transit on an open-sided vehicle, said device comprising:

a. a pair of longitudinally-extended, rigid guard members of a length and configuration such that each is adapted, when separably attached to said bulldozer in a position generally parallel and adjacent to the exterior side of a blade-lifting arm member of said bulldozer, at one of its ends having an inclined hook shaped portion extending laterally with respect to the guard member and with lateral reinforcing means extending between the portions of the hook, to partially shield at least a portion of the adjacent vertical edge of the blade member of said bulldozer and at its other end at least to partially shield the adjacent extremity of said blade-lifting arm member, whereby another vehicle colliding with said open-sided vehicle will be deflected by said guard member away from said vertical edge; and b. a plurality of rigid arm-like hanger members extending rearwardly from each of said guard members, and adapted for separably connecting and maintaining said guard member to said bulldozer in the aforesaid position with respect to a blade-lifting arm member and said blade member of said bulldozer.

2. Traffic protective device according to claim 1, wherein said hanger members are adapted to be separably attached to said adjacent blade-lifting arm member.

* * * * *